Patented Mar. 3, 1925.

1,528,470

UNITED STATES PATENT OFFICE.

HUGH ALBERT EDWARD DRESCHER AND JOHN THOMAS, OF CARLISLE, ENGLAND, ASSIGNORS TO SCOTTISH DYES, LIMITED, OF CARLISLE, CUMBERLAND, ENGLAND.

PRODUCTION OF NITROGEN-CONTAINING ANTHRAQUINONE BODIES.

No Drawing.  Application filed March 26, 1924. Serial No. 702,198.

*To all whom it may concern:*

Be it known that we, HUGH ALBERT EDWARD DRESCHER and JOHN THOMAS, both subjects of the King of Great Britain and Ireland, and both residing at Murrell Hill Works, Carlisle, in the county of Cumberland, England, have invented certain new and useful Improvements in and Relating to the Production of Nitrogen-Containing Anthraquinone Bodies, of which the following is a specification.

This invention relates to the production of derivatives of anthraquinone.

It is specifically directed to the manufacture of amino-derivatives of anthraquinone but includes intermediate products.

The main object of the invention is to provide a process for the production of amino-derivatives of anthraquinone which are difficult to obtain by the present recognized processes.

In investigating this matter we have made a number of experiments and have found that if halogen derivatives of anthraquinone are treated with an imide of a dibasic acid, such as phthalimide in the presence of copper and an acid absorber, such as sodium acetate, at an elevated temperature, the halogen is eliminated in the form of acid and a product is formed from the anthraquinone body and the imide. This product can be treated, for example, with sulphuric acid so as to regenerate the dibasic acid and form an amino-derivative of anthraquinone.

We have found that by this process we can obtain amino-anthraquinones which are difficult to secure by other means. Among those which we have successfully converted into amino-derivatives may be cited 1-chlor-anthraquinone, 1:8-dichlor-anthraquinone, 1-chlor-4-nitro-anthraquinone, 1-chlor-4-oxy-anthraquinone, 1-chlor-5-nitro-anthraquinone.

We have also found that when the imide of the dibasic acid will form a metal salt this can be used instead of the imide; for example, the potassium derivative of phthalimide can be used instead of phthalimide.

When a metal salt of an imide is used the presence of an acid absorber in the melt is not necessary.

Our invention consists in the treatment of a halogen derivative of anthraquinone with the imide of a dibasic acid in the presence of copper at a suitable temperature.

References to the imide of a dibasic acid in this specification and claims, except where the text otherwise requires, include a metal salt of such imide, and references to copper similarly include copper in the metallic form or as a salt.

The invention also consists in the preparation of amino derivatives of anthraquinone by hydrolyzing an amido derivative prepared according to the method of the preceding paragraph.

The invention further consists in the partial hydrolysis of an imide derivative prepared as described above for the production of a substituted benzoyl derivative.

The invention also consists in the processes and products hereinafter described.

Several examples are given below of methods of carrying the invention into effect.

Example 1.

This deals with the production of 1-phthalimido-anthraquinone from 1-chlor-anthraquinone and its conversion into 1-amino-anthraquinone.

10 parts of 1-chlor-anthraquinone, 7.5 parts of phthalimide, 5 parts of sodium acetate and 0.1 part of copper bronze are suspended in 12.5 parts of nitrobenzene and heated to 200° C. The mixture is well stirred and is kept at this temperature for a period of 2 hours. The melt is then allowed to cool. The crude 1-phthalimido-anthraquinone crystallizes out as pale orange crystals. These are filtered off, dried and washed with hot water, and again dried. The yield of 1-phthalimido-anthraquinone is 92% of the theoretical. The product can be recrystallized from nitrobenzene.

10 parts of the condensation product are dissolved in 35 parts of concentrated sulphuric acid and the mixture is heated to 100° C. for one hour. After being allowed to cool, the mixture is poured into water, when 1-amino-anthraquinone separates as a finely divided bright scarlet solid, which is filtered off, washed and dried. The yield of 1-amino-anthraquinone from 1-chlor-anthraquinone by this process is 90% of the theoretical.

Example 2.

This deals with the production of 1-phthalimido-anthraquinone from 1-chlor-anthraquinone and its conversion into 1-amino-anthraquinone.

10 parts of 1-chlor-anthraquinone, 7.5 parts of phthalimide, 5 parts of sodium acetate and 0.1 part of copper bronze are intimately mixed and heated to a temperature of from 200 to 210° C. for a period of four hours. Suitable precautions must be taken that the temperature is uniform throughout the whole mixture, for example, by mechanical stirring or otherwise, in the former case the stirrers being made for example preferably of enamelled iron.

After the specified time has elapsed, the melt is allowed to cool, is extracted with hot water, filtered and dried. The product, 1-phthalimido-anthraquinone may be recrystallized for example from nitrobenzene or nitrotoluol.

10 parts of the condensation product are dissolved in 35 parts of concentrated sulphuric acid, the mixture is heated to 100° C. for a period of one hour, then allowed to cool and poured into water. The product, 1-amino-anthraquinone, separates out and is filtered off, washed and dried.

Should there be any unchanged halogen derivative present this last treatment with sulphuric acid can be used as a basis of separating the halogen derivative from the amino body, the concentration of the acid being first of all gradually reduced until all the halogen derivative is precipitated. The melt is then poured into water and the amino derivative precipitated out and isolated in the usual way.

*Example 3.*

This deals with the production of 1.5-diphthalimido-anthraquinone from 1.5-dichlor-anthraquinone and its conversion into 1.5-diamino-anthraquinone.

10 parts of 1.5-dichlor-anthraquinone, 11.8 parts of phthalimide, 9 parts of sodium acetate and 0.1 part of copper bronze are suspended in 22 parts of nitrobenzene and heated to 195° C. with good stirring for a period of 2 hours. The mixture is cooled and the crystals of 1.5-diphthalimido-anthraquinone, which are deposited, are filtered off, washed and dried. The crude condensation product is purified by extraction with hot water. It is then dried.

10 parts of the 1.5-diphthalimido-anthraquinone thus obtained are dissolved in 50 parts of concentrated sulphuric acid and the mixture is heated to 90 to 100° C. for ½ hour. It is then allowed to cool and poured into water. 1.5-diamino-anthraquinone separates out, and is filtered off, washed and dried.

*Example 4.*

This deals with the production of 1-chlor-5-phthalimido-anthraquinone from 1.5-dichlor-anthraquinone and its conversion into 1-chlor-5-amino-anthraquinone.

10 parts of 1.5-dichlor-anthraquinone and 3.8 parts of sodium acetate are added to 43 parts of nitrobenzene. The mixture is heated to 170° with efficient stirring. During a period of 1 hour, a mixture of 5.3 parts of phthalimide and 0.2 parts of copper bronze is added. The temperature is then raised to 175° C. and kept at this for five hours. The melt is cooled, and when the product, crude 1-chlor-5-phthalimido-anthraquinone, has crystallized out, it is filtered off, washed and dried. The crude product is purified by extraction with hot water. It is then dried; 10 parts of this washed and dried condensation product are added to 50 parts of concentrated sulphuric acid, and the mixture heated to 100° C. for one hour, then cooled and poured into water, filtered, washed and dried.

Alternatively, the cooled solution is diluted by the addition of 8.5 parts of water with good stirring. After cooling the mixture, the solid deposited is filtered off, washed and dried. The product is mainly 1-chlor-5-amino-anthraquinone.

In a similar way 1-methyl-amino-4-amino-2-brom-anthraquinone may be prepared from 1-methyl-amino-2-4-dibrom-anthraquinone.

*Example 5.*

This deals with the production of 1-phthalimido-2-nitro-anthraquinone from 1-chlor-2-nitro-anthraquinone and its conversion into 1-amino-2-nitro-anthraquinone.

10 parts of 1-chlor-2-nitro-anthraquinone, 6.5 parts of phthalimide, 4.3 parts of sodium acetate and 0.1 part of anhydrous cupric chloride are added to 30 parts of nitrobenzene and the mixture is well stirred and heated to its boiling point. It is kept gently boiling for a period of 3 hours, and is then allowed to cool. When the crude product, 1-phthalimido-2-nitro-anthraquinone has crystallized out, it is filtered off, washed and dried. It is then washed well with hot water and again dried.

10 parts of this product are added to 40 parts of concentrated sulphuric acid and the mixture warmed to 100° for a period of one hour, after which it is cooled and poured into water. The bright orange-red product which separates out is 1-amino-2-nitro-anthraquinone. This is filtered off, washed and dried.

*Example 6.*

This deals with the production of 1-amino-2-methyl-4-phthalimido-anthraquinone from 1-amino-2-methyl-4-bromo-anthraquinone and its conversion into diamino-2-methyl-anthraquinone.

10 parts of 1-amino-2-methyl-4-bromo-anthraquinone, 5.8 parts of phthalimide, 3.3 parts of sodium acetate and 0.1 part of anhydrous cupric chloride are added to 30 parts of nitrobenzene. The mixture is heated to 180° to 185° C. for a period of 5 hours, and then allowed to cool. When the condensation product, crude 1-amino-2-methyl-4-phthalimido-anthraquinone has crystallized out, it is isolated by filtration. It is then washed and dried. The product is washed with hot water and dried.

10 parts of this washed and dried product are suspended in 40 parts of concentrated sulphuric acid and the mixture heated to 100° for one hour. It is then cooled, and poured into water. The desired product, diamino-2-methyl-anthraquinone separates and is removed by filtration. The product is washed and dried.

Example 7.

This deals with the production of 1-methyl-amino-4-phthalimido-anthraquinone from 1-methyl-amino-4-bromo-anthraquinone and its conversion into 1-methyl-amino-4-amino-anthraquinone.

31.6 parts of 1-methyl-amino-4-bromo-anthraquinone, 10 parts of anhydrous sodium acetate, 18 parts of phthalimide and 0.32 part of copper bronze are suspended in 30 parts of nitrobenzene and the mixture heated with good stirring to a temperature of 210° C. for a period of four hours. The melt is then allowed to cool and when the crystalline product, 1-methyl-amino-4-phthalimido-anthraquinone has separated out, it is filtered off, and the nitrobenzene removed. This crude product is extracted with hot water and again washed and dried.

10 parts of this product are added to 35 parts of concentrated sulphuric acid and this mixture heated to 100° C. for a period of one hour. The mixture is allowed to cool, is poured into water and the solid, which separates out, is filtered off, washed with water and dried. It consists wholly or largely of 1-methyl-amino-4-amino-anthraquinone.

Example 8.

This deals with the production of 1-phthalimido-2-amino-anthraquinone from 1-chlor-2-amino-anthraquinone and its conversion into 1.2-diamino-anthraquinone.

5.7 parts of phthalimide, 4 parts of sodium acetate and 0.1 part of cupric chloride are suspended in 40 parts of nitrobenzene and heated to 190–195°. The mixture is well stirred and kept at this temperature while 10 parts of 1-chlor-2-amino-anthraquinone are added over a period of 2 hours. After a further period of one hour at 190–195° C. the melt is allowed to cool. When the product has crystallized out, it is filtered off, washed and dried. This crude 1-phthalimido-2-amino-anthraquinone is purified by extraction with hot water, and is dried.

10 parts of the washed and dried condensation product are added to 40 parts of concentrated sulphuric acid, and the mixture heated to 100° C. for one hour. After being cooled, the mixture is poured into water and the 1.2-diamino-anthraquinone, which separates, is filtered off, washed and dried.

Example 9.

This deals with the production of 2-phthalimido-anthraquinone from 2-brom-anthraquinone and its conversion into 2-amido-anthraquinone. It includes the preparation of 2-benzoyl-amido-anthraquinone-2'-carboxylic acid.

29 parts of 2-brom-anthraquinone, 18.5 parts of phthalimide, 10 parts sodium acetate, 0.3 parts of copper chloride are suspended in 60 parts of nitrobenzene and heated with good stirring for several hours at 200° C. until the reaction is complete. It is cooled and filtered, the product freed from nitrobenzol, and the crude product extracted with hot water, filtered and dried. The product is crude 2-phthalimido-anthraquinone. Any unchanged 2-brom-anthraquinone contained in the crude 2-phthalimido-anthraquinone thus obtained can be isolated by treating the product with caustic soda, for example, with 100 parts of a 0.5% solution at the boil; this partially hydrolyzes the 2-phthalimido-anthraquinone to 2-benzoyl-amido-anthraquinone-2'-carboxylic acid, and gives a soluble sodium salt leaving the 2-brom-anthraquinone unaffected. On acidifying the filtrates, the 2-benzoyl-amido-anthraquinone-2'-carboxylic acid is precipitated; this can be filtered and dried.

For the preparation of 2-amido-anthraquinone, 10 parts of 2-phthalimido-anthraquinone or of its derivative, 2-benzoyl-amido-anthraquinone-2'-carboxylic acid, are dissolved in 100 parts of concentrated sulphuric acid and warmed for one hour at 90 to 100° C. The melt is then poured into water, boiled, and the precipitated 2-amido-anthraquinone filtered off and dried.

Example 10.

This deals with the production of 1-phthalimido-anthraquinone from 1-chlor anthraquinone and its conversion into 1-amino-anthraquinone and is a modified form of Example 1.

In this example 5 parts of 1-chlor-anthraquinone are warmed with 10 parts of phthalimide, 0.5 part of copper powder and 2 parts of fused sodium acetate. The mixture is well powdered and melted together with stirring at 200 to 250° C. for a short time until tests show that no more halogen derivative is present. The melt is then poured into water, filtered, washed from water soluble material and dried.

It consists of crude 1-phthalimido-anthraquinone.

The dried product is dissolved in ten times its weight of sulphuric acid and kept at 100° C. for one hour, after which it is poured into a large excess of water, filtered, washed and dried. It consists substantially of 1-amino-anthraquinone.

Should there be any unchanged halogen derivative present, this last treatment with sulphuric acid can be used as a basis of separating the halogen derivative from the amino body, the concentration of the acid being first of all gradually reduced until all the halogen derivative is precipitated. The melt is then poured into water and the amino derivative precipitated out and isolated in the usual way.

*Example 11.*

This deals with the production of 1-succinimido-anthraquinone from 1-chlor-anthraquinone and its products of hydrolysis for example 1-amino-anthraquinone.

10 parts of 1-chlor-anthraquinone, 5 parts of succinimide, 4 parts of sodium acetate and 0.1 part of copper chloride are suspended in 25 parts of nitrobenzene and heated to 185° C. with good stirring for a period of 2 hours. The mixture is allowed to cool and when the condensation product, namely, 1-succinimido-anthraquinone, has separated as pale yellow crystals, the mother liquor is removed and the product dried. This crude product may be purified by extraction with hot water, filtration and drying.

During the above treatment part of the succinimido-anthraquinone is apparently hydrolyzed and a crop of the sodium salt of the resulting carboxylic acid can be obtained by salting out and cooling the water filtrates from the aforesaid extraction, or alternatively by precipitation by acidifying these filtrates.

10 parts of the condensation product are dissolved in concentrated sulphuric acid and the mixture heated to 100° C. for one hour. The mixture is cooled, poured into water and 1-amino-anthraquinone separates and may be filtered off, washed and dried.

In the above hydrolysis, 10 parts of succinimido-anthraquinone can be replaced by 10 parts of its partially hydrolyzed derivative.

Having now described our invention, what we claim as new and desire to secure by Letters Patent is:—

1. A method for the production of amino derivatives of anthraquinone which consists in the treatment of halogen derivatives of anthraquinone with an imide of a dibasic acid in the presence of copper followed by hydrolysis.

2. A method of producing anthraquinone derivatives which comprises treating a halogen derivative of anthraquinone with an imide of a dibasic acid in the presence of copper.

3. As a new intermediate, 1-phthalimido-anthraquinone, the same being a solid, soluble in hot nitrobenzene and crystallizing as pale yellow crystals, on cooling the solution, and not substantially affected by hot water, substantially as above described.

4. A method as claimed in claim 1 in which the copper is in the form of a bronze powder.

5. Anthraquinone derivatives prepared by the process of claim 1.

In testimony whereof we have signed our names to this specification.

HUGH ALBERT EDWARD DRESCHER.
JOHN THOMAS.